(No Model.)
M. P. JACOBS.
GARDEN PLOW.
No. 536,211. Patented Mar. 26, 1895.
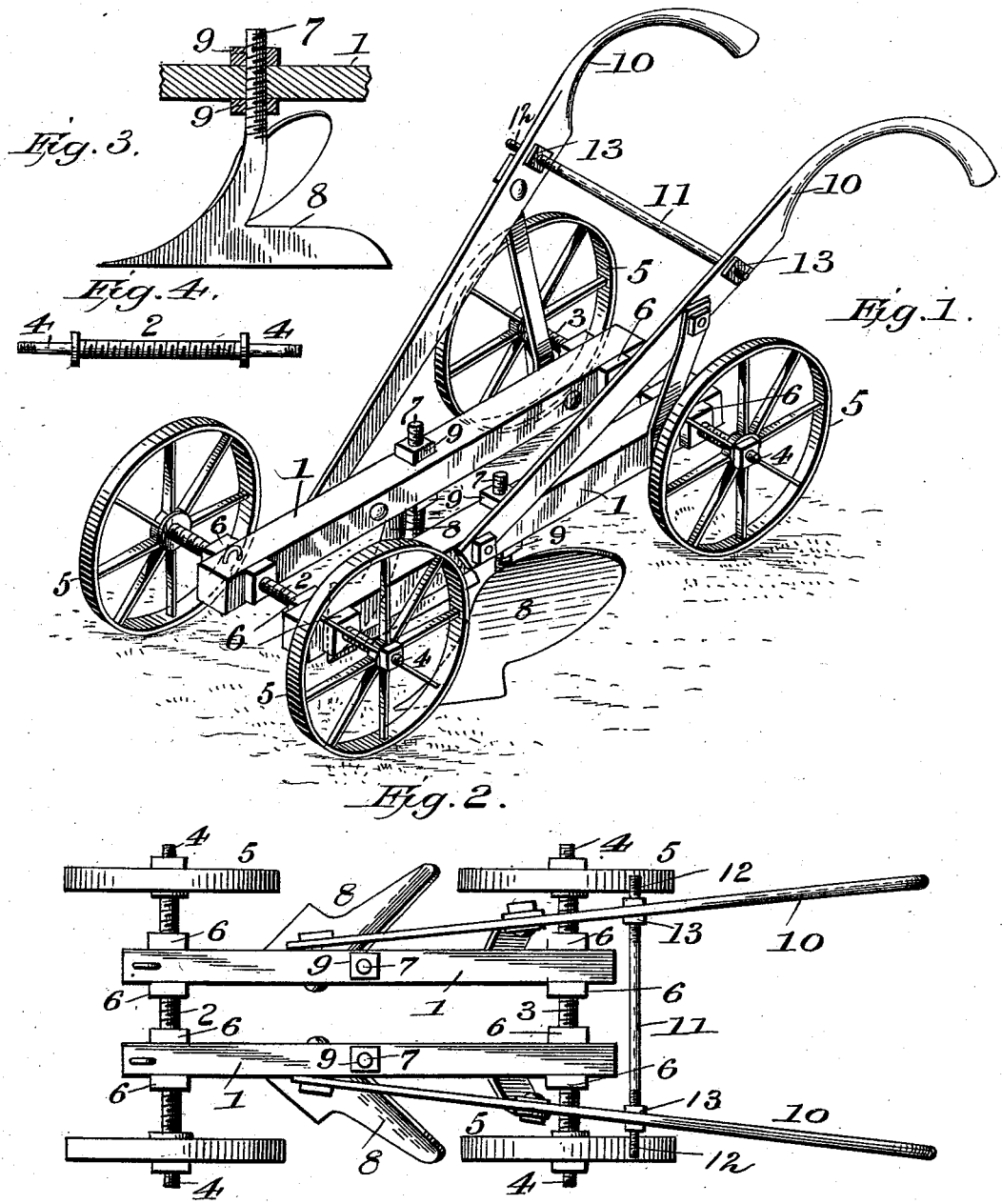
WITNESSES.
F. L. Ourand
Alvan Macauly
INVENTOR.
Martine P. Jacobs
by J. Fred Keily
his Attorney.

UNITED STATES PATENT OFFICE.

MARLINE P. JACOBS, OF TOLU, KENTUCKY.

GARDEN-PLOW.

SPECIFICATION forming part of Letters Patent No. 536,211, dated March 26, 1895.

Application filed August 13, 1894. Serial No. 520,203. (No model.)

*To all whom it may concern:*

Be it known that I, MARLINE P. JACOBS, a citizen of the United States, residing at Tolu, in the county of Crittenden and State of Kentucky, have invented certain new and useful Improvements in Garden-Plows; and I do declare the following to be a full, clear, and exact description of the invention, such as will enable others skilled in the art to which it appertains to make and use the same, reference being had to the accompanying drawings, and to the figures of reference marked thereon, which form a part of this specification.

My invention consists in a new and improved garden plow, which is especially designed for use in garden-cultivation, and which is so constructed that it can be easily run by one or two persons without the use of horse power. My invention is so arranged, however, that one or two horses may be hitched to it when desired for heavy garden or field work, and its various advantages will be hereinafter fully described, and claimed.

Referring to the accompanying drawings, in which the same numerals of reference indicate corresponding parts in the several views, Figure 1 is a perspective view of my garden plow. Fig. 2 is a top plan view of the same. Figs. 3 and 4 are detail views.

Referring to the several parts by their designating numerals, 1, 1, indicate the two straight parallel body-beams of my garden plow, which are arranged side by side as shown. Through the ends of these bars or beams pass transverely the two end-axles, 2, 3, which may be arched at the center between the beams, when desired, or may be perfectly straight as shown in the drawings. These round metal axles are threaded, and are shouldered near their ends to form spindles 4 for the reception of the wheels 5; and upon each axle on the inner and outer sides of the beams 1 are mounted the adjusting and binding nuts, 6, for the purpose hereinafter specified.

Through the central part of the beams 1, 1, extend the threaded stems 7 of two shovel attachments, 8, 8; each of the said reversible plows or shovels being formed with the threaded stem 7 and having two heavy adjusting and locking nuts, 9, 9, mounted upon said threaded stem, one on the under and one on the upper side of the beam 1. It will be seen that by this construction that by loosening said adjusting nuts the shovels may be reversed, and raised or lowered to adjust the depth at which the shovels will enter the ground, lowering or raising the standards to make the plows run deep or shallow.

It will be seen that by the construction before described that I produce a rectangular frame, supported at both ends upon the large carrying wheels 5, these cast-iron wheels being of such size as to run upon the ground and support the weight of the plows and frame at both ends thereof while the blades are cutting through the ground at the required depth, to which they have been adjusted. By turning the adjusting nuts 6 on the end-axles 2, 3, the parallel beams 1, 1, can be adjusted nearer together or farther apart upon the said threaded axles, to "set" or adjust the space between the two plow-blades, carried by said beams, bringing them nearer together or setting them farther apart, as desired.

Upon the beams are secured the handles, 10, which are connected by the metal rod 11, having the threaded ends 12 which run through the handles, and adjusting nuts 13, 13, are mounted on said threaded ends on both sides of the handles, by turning which the handles are adjusted to correspond with the adjustment of the beam 1 to which they are secured, separating or drawing them together.

To the front end of the beams 1 staples may be secured, to which a single or double tree can be attached by chains or other suitable device, to permit of one or two horses being hitched to the plow if at any time desired for field work or the like.

It will be seen from the foregoing description, taken in connection with the accompanying drawings, that I produce a garden plow which is very effective while singularly light and easy to run. The four large end-wheels, 5, support the entire weight of the adjustable body-beams, having the adjustable plow-blades and adjustable handles, so that the machine runs with unusual lightness and ease, and can be readily operated in the garden by one person, without requiring the use of horse power.

Having thus described my invention, what

I claim, and desire to secure by Letters Patent, is—

1. The garden plow comprising the transverse threaded end-axles having the end supporting wheels, the two parallel beams having the openings in their ends through which said axles pass, and having centrally-arranged plow blades, and suitable handles, and the adjusting nuts mounted on said threaded axles on both sides of said beam-ends; substantially as set forth.

2. The garden plow comprising the transverse threaded end-axles having the end supporting wheels, the two parallel beams having the openings in their ends through which said axles pass, and having the vertically adjustable plow blades, and suitable handles, and the adjusting nuts mounted on said threaded axles on both sides of said beam-ends; substantially as set forth.

3. The herein-described garden plow, consisting of the threaded transverse end-axles, having the end supporting-wheels, the two parallel beams having the openings in their ends through which said axles pass, and having the central vertically-adjustable plow-blades, the adjusting nuts mounted on said threaded axles on both sides of said beam-ends, the handles secured to the two adjustable beams, and the rod having the threaded ends running through said handles, and the adjusting nuts mounted on said ends on both sides of the handle, substantially as set forth, for the purposes specified.

In testimony whereof I affix my signature in presence of two witnesses.

MARLINE P. JACOBS.

Witnesses:
C. E. WELDON,
C. J. BOZEMUN.